Patented Oct. 21, 1930

1,779,243

UNITED STATES PATENT OFFICE

CHARLES JOSEPH MICHEL MARIE LE PETIT, OF ANNEVILLE-SUR-MER, FRANCE, ASSIGNOR, BY MESNE ASSIGNMENTS, TO RÖHM & HAAS COMPANY, OF PHILADELPHIA, PENNSYLVANIA, A CORPORATION OF DELAWARE

PROCESS OF PREPARING ENZYMIC PRODUCTS

No Drawing. Application filed October 23, 1928, Serial No. 314,543, and in France November 16, 1927.

This invention relates to a process for the production of enzymes for industrial use and has for its object the preparation of products rich in proteolytic, lipolytic and kindred enzymes starting with mold cultures.

The use of molds has been known for a long period of time in the manufacture of cheese, alcohol, koji, sake (beverages), soya bean sauce, etc. The available moulds constitute a large number of species the diastases or enzymes secreted by which perform the function of agents which convert the materials upon which they are cultivated to a greater or less degree according to species, this action being particularly extensive in connection with carbohydrate, protein and fatty materials.

In most cases the action of the moulds is extremely slow because they allow their enzymes to diffuse only gradually and incompletely, a large portion remaining within the walls of the mould cells.

The present invention is designed to overcome this defect, according to the provisions of which invention one adds to the mould cultures plasmolyant salts, such as sea salt, sodium sulphate, magnesium sulphate, sodium bicarbonate, etc., these salts having the property of extracting the contents of the myceline cells and spores and liberating the enzymes contained therein in a few minutes.

The proportion to be added varies according to the state of the culture; it should, however, always be sufficiently high to cause plasmolysis. The mould cultures thus treated may then be dried in vacuum driers or at low temperatures thus producing dehydration of the culture medium and conversion of the latter into a dry powder. It is, however, preferable to add to the mould cultures salts which, in addition to their power of plasmolysis, are capable of dehydrating the culture medium.

According to the invention a double plasmolyzing and dehydrating action is obtained by adding to the culture medium anhydrous sodium sulfate or a mixture of this salt with suitable quantities of sodium bicarbonate and boric acid. One thus obtains a perfectly stable dry powder with a constant enzymic powder. This powder is the ground and sifted mixture of the nutrient medium on which the mold has been developed and of the mold itself and of the plasmolyzing and dehydrating salt. The water which stayed in the mass after the development of the mold is absorbed by the salt, which passes from the anhydrous salt over into salt with water of crystallization.

*Example.*—The nutrient medium may consist of 100 pounds of bran, shorts, middlings, or ground oil meal cakes which are rich in starch and proteins. It is sterilized either by heating or by the addition of an antiseptic medium such as, for instance, ½ pound of formic acid. This sterilized nutrient is mixed with about its own weight of water and sown with 3 oz. of a suspension of spores of a pure culture of *Aspergillus oryzæ*. (The amount of suspended spores is hard to determine but would only influence the speed of growth to some extent.) This mass is put into an oven, which is kept at about 30° C., on trays in two to three centimeter thick layers. The spores germinate and the mold develops throughout the whole mass and forms a solid cake. Heat is generated through the fermentation, which causes part of the water to evaporate, but there still remains about 25 to 30% in the cake. The cake is then broken up and mixed intimately with 50% of anhydrous sodium sulphate, 2% of sodium bicarbonate and 2% of boric acid. Part of the moisture of this product could be removed before or after adding the dehydrating salt by drying in a vacuum dryer at low temperature. The anhydrous sodium sulphate takes up all the water present as water of crystallization and the dry product so prepared is ground, sifted and is then ready for application. (By dehydrating, in the sense of this application is meant the transformation of a moist product into a dry product, not necessarily the removal of water. The bran culture is moist, whereas after the admixture of anhydrous sodium sulphate to it it becomes a dry powder.)

The powder thus obtained has very great enzymic power and is well adapted for use in preparing hides for tanning. Hides cleaned and softened are passed in known manner into a bath of caustic soda which acts in the same manner as calcium hydroxide ordinarily used. The caustic soda is used to swell the skin in order to facilitate penetration of the enzymes into the skin. The hides are then introduced into a bath containing about 2% of the enzymic product obtained as above described and are depilated in a few hours. By this treatment the epidermis is digested, the fats saponified and the hide perfectly prepared for the tannin.

The mould cultures mentioned above comprise a nutrient medium consisting of bran, shorts, ground oil meal cakes, etc., on which are sown spores of fungi such as *Aspergillus oryzæ*.

While being much more active than any of the products hitherto prepared, the new enzymic product presents the advantage of being low in cost and thus of commercial value.

While I have in the above description endeavored to define what I believe to be a preferred and practical form of the invention, it is to be understood that the specific details are merely by way of example and not limitative of the scope of the process which is to be measured by liberal interpretation of the appended claims.

What I claim is:

1. An enzymic product comprising desiccated and plasmolyzed mold cultures and sodium sulphate.

2. An enzymic product comprising desiccated and plasmolyzed mold cultures and sodium sulphate, sodium bicarbonate and boric acid.

3. An enzymic product comprising a mixture of desiccated and plasmolyzed cultures of *Aspergillus oryzæ* and anhydrous sodium sulphate.

4. An enzymic product comprising a mixture of desiccated and plasmolyzed cultures of *Aspergillus oryzæ* mixed with sodium sulphate, sodium bicarbonate and boric acid.

5. The step in the process of preparing an enzymic product which comprises plasmolyzing and dehydrating mold cultures by addition of salts capable of producing plasmolysis and dehydration.

6. Process of preparing an enzymic product which comprises sowing a nutrient medium with a culture of *Aspergillus oryzæ* heating at a temperature of about 30° C. then mixing the product with plasmolyzing and dehydrating salts.

7. The step in the process of preparing an enzymic product which comprises plasmolyzing and dehydrating a mold culture by mixing with anhydrous sodium sulphate.

8. The step in the process of preparing an enzymic product which comprises plasmolyzing and dehydrating a culture of *Aspergillus oryzæ* by mixing in anhydrous sodium sulphate.

9. The step in the process of preparing an enzymic product which comprises plasmolyzing and dehydrating a mold culture with anhydrous sodium sulphate, sodium bicarbonate and boric acid.

10. In the process of preparing an enzymic product the step which comprises plasmolyzing and dehydrating a culture of *Aspergillus oryzæ* by mixing with anhydrous sodium sulphate, sodium bicarbonate and boric acid.

11. An enzymic product comprising desiccated mold cultures and plasmolyzing and dehydrating salts.

12. The process of preparing an enzymic product which comprises submitting a mold culture to the action of plasmolyzing and dehydrating salts.

In testimony whereof I have signed my name to this specification.

CHARLES JOSEPH MICHEL MARIE LE PETIT.